Patented Aug. 21, 1928.

1,681,369

UNITED STATES PATENT OFFICE.

FRITZ SEEBACH, OF ERKNER, NEAR BERLIN, GERMANY, ASSIGNOR TO BAKELITE GESELLSCHAFT M. B. H., OF ELKNER, NEAR BERLIN, GERMANY.

PURIFYING PHENOLALDEHYDE RESINS.

No Drawing. Application filed January 21, 1926, Serial No. 82,844, and in Germany January 27, 1925.

The condensation resins produced from phenols and aldehydes generally contain uncombined phenol and other undesired by-products. The by-products produced by the by-reaction of aldehydes on the phenols are soluble in water in the presence of alkalies, have a decided odor, and can be transformed into coloured products by the action of light and air, but their chemical constitution is not at present known. For the purpose of removing the said impurities it has been proposed to precipitate or treat the resins in alkaline solutions with acids. It has also been proposed to transform the resincus condensation products partly into salts of the condensation products which have acid character and to precipitate or salt out the resins by means of salts. This process has been carried out with a true solution of the condensation products.

The present process consists in adding to the condensation products or resins some water, but not more than the equal amount by weight, as well as such small amounts of alkalies agitating vigorously so that the resins form a colloidal suspension. Such suspension is very viscous, completely opaque, flows slowly, tends when allowed to stand to gelatinize and consists, as the examination under the ultramicroscope shows, of ultra-microns, whereas a true solution is optically inactive. The present process may be applied to all phenolaldehyde resins, obtained without condensing agents or with alkali or acid or both these condensing agents as far as the resins have the property of giving solutions by adding water and alkali, also solutions of colloidal character. The next step of the present invention consists in precipitating the resins from the colloidal suspension by means of salts. Neutral, basic or acid salts may be used. Suitable salts, are for instance, sodium chloride, ammonium chloride, alkali metal carbonates, ammonium carbonates, magnesium chloride, magnesium sulphate, aluminium sulphate, the various alums. The single salts or their mixtures may be used. The resins are obtained by the precipitation in a gel-like form, and may be washed with water, organic liquids (solvents for the impurities) or salt solutions.

The process can be modified by adding to the colloidal suspension so-called hydrotropical salts which have the property of rendering difficultly soluble or insoluble substances soluble in water (see Neuberg, Sitzungsberichte der preussischen Akademie der Wissenschaften, 1916, page 1034), for instance sodium salicylate, the salts of the higher fatty acids, as the alkali metal soaps, the alkali metal salts or soaps of the sulphonated fatty acids, resin acids, hydroxy fatty acids, halogenated fatty acids. Hydrotropic salts may be used which do not form insoluble compounds with the precipitating salts. If the hydrotropic salts are precipitated with the resins the washing operation can be carried out preferably by means of water.

After having been washed and dried the condensation products obtained according to the present process are bright, and are odourous, light resistant pulverous substances, their melting point being higher than that of the raw resins, for instance by 100 degrees and more. The resins maintain their pulverous state very long when being stored. They dissolve in organic solvents of the condensation resins such as alcohol or spirit. By centrifuging the solutions in organic solvents precipitated metal hydroxides can be separated from the solutions.

*Example 1.*—10 kilograms of a phenol formaldehyde-resin are mixed with 8 litres water and are agitated adding gradually 700 cubic centimeters of a 33 percentage caustic soda lye by means of a quickly running agitator until a colloidal suspension of the resin will be formed. This suspension is caused to flow into 100 litres of a saturated aqueous solution of sodium chloride agitating it well. The precipitated resin accumulates quickly and is separated from the liquid by centrifuging.

*Example 2.*—10 kilograms of phenolaldehyde resin are transformed into a colloidal suspension as in Example 1 an aqueous solution containing 10% of alum or aluminium sulphate is added until the resin begins to accumulate at the bottom of the vessel. It is separated from the liquid by centrifuging. Preferably the precipitation is carried out at about 60–80 degrees centigrade.

*Example 3.*—10 kilograms of phenolaldehyde resin are transformed into a colloidal suspension as in Example 1 and 100 ccm. of a solution containing 30% of sodium salicylate is added to the suspension. Thereupon the resin is precipitated with a solution containing 25–30% calcium chloride, its deposits representing a bright powder, which can be easily separated and dried in the air.

I claim:—

1. The process for purifying fusible, soluble phenolaldehyde resins which consists in treating the fusible, soluble raw phenolaldehyde resins with not more than equal parts of water and with sufficient alkali to form a colloidal suspension and then precipitating the said resins by adding salts which have the property of salting out resins.

2. The process for purifying fusible, soluble phenolaldehyde resins which consists in treating the fusible, soluble raw phenolaldehyde resins with not more than equal parts of water and with sufficient alkali to form a colloidal suspension, adding to the said suspensions so-called hydrotropic salts, which have the property of rendering difficultly soluble or insoluble substances soluble in water, but do not affect the solubility of the said resins, and then precipitating the said resins by adding salts which have the property of salting out resins.

3. The process for purifying fusible, soluble phenolaldehyde resins which consists in treating the fusible, soluble raw phenolaldehyde resins with not more than equal parts of water and with sufficient alkali to form a colloidal suspension, adding to the said suspension a mixture of precipitating salts and so-called hydrotropic salts, which have the property of rendering difficultly soluble or insoluble substances soluble in water, but do not affect the solubility of the said resins.

4. The process for purifying fusible, soluble phenolaldehyde resins which consists in treating the fusible, soluble raw phenolaldehyde resins with not more than equal parts of water and with sufficient alkali to form a colloidal suspension, adding to the said suspension salts having the property of salting out resins and after having precipitated resins adding so-called hydrotropic salts, which have the property of rendering difficultly soluble or insoluble substances soluble in water, but do not affect the solubility of the said resins.

In testimony whereof I hereunto affix my signature.

FRITZ SEEBACH.